United States Patent [19]

Hills

[11] Patent Number: 4,821,890
[45] Date of Patent: Apr. 18, 1989

[54] BICYCLE SUPPORT RACK

[76] Inventor: Geoffrey O. Hills, Piscataqua Rd., Durham, N.H. 03824

[21] Appl. No.: 85,891

[22] Filed: Aug. 14, 1987

[51] Int. Cl.⁴ .............................................. A47F 7/00
[52] U.S. Cl. ...................................... 211/18; 211/113
[58] Field of Search .................. 211/18, 17, 13, 113, 211/88, 64, 63; 248/300, 339, 304, 305, 301

[56] References Cited

U.S. PATENT DOCUMENTS

| | | | |
|---|---|---|---|
| 846,956 | 3/1907 | Shaw | 248/304 X |
| 3,782,559 | 1/1974 | Wright | 248/339 X |
| 3,976,200 | 8/1976 | Munns | 211/18 |
| 4,609,173 | 9/1986 | Belokin | 211/94 X |
| 4,700,845 | 10/1987 | Fretter | 211/18 |

FOREIGN PATENT DOCUMENTS 13975 of 1898 United Kingdom ................. 211/18

Primary Examiner—Alvin C. Chin-Shue
Assistant Examiner—Sarah A. Lechok Eley
Attorney, Agent, or Firm—Lahive & Cockfield

[57] ABSTRACT

Disclosed is an apparatus for storing bicycles above ground level. The apparatus comprises an integral support rack having a vertical bracket securable to a wall and a deformable arm which has mounted thereto and a device for receiving and supportingly engaging the horizontal top tube of a bicycle. A single rack is suitable for supporting a bicycle.

13 Claims, 1 Drawing Sheet

U.S. Patent        Apr. 18, 1989        4,821,890
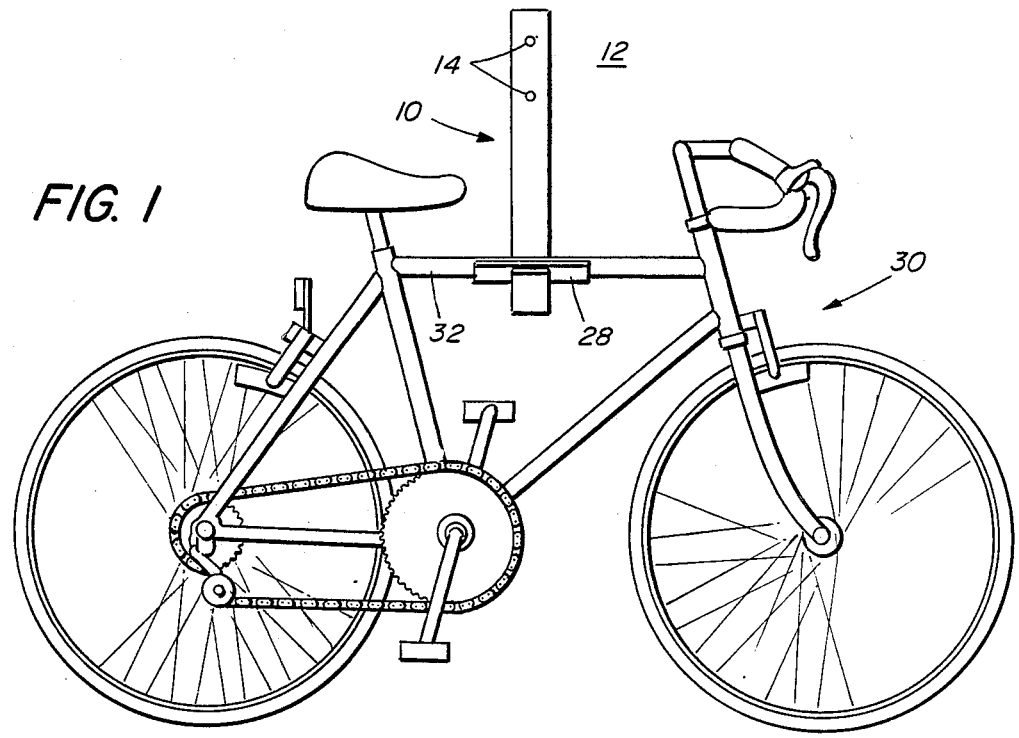
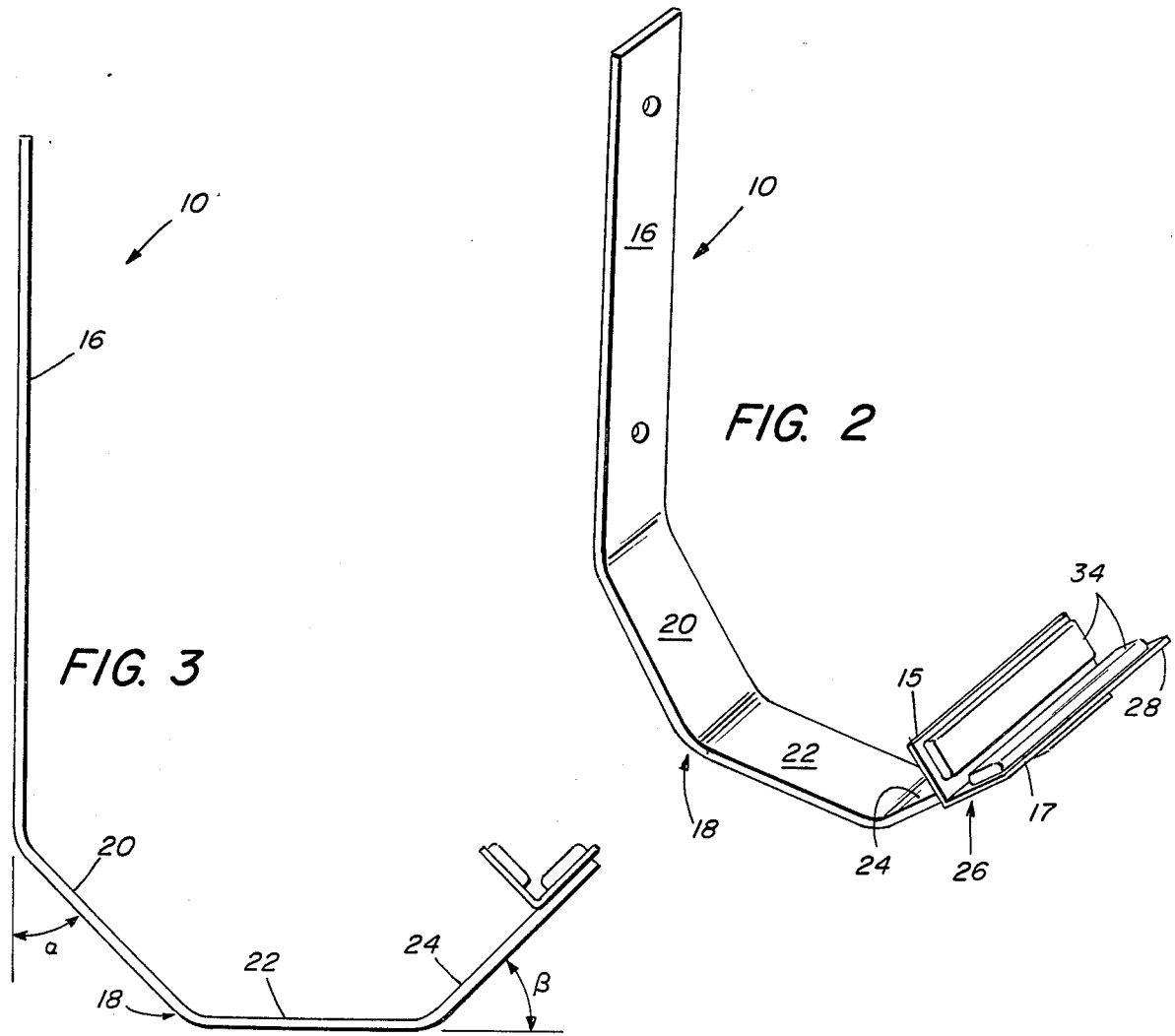

BICYCLE SUPPORT RACK

FIELD OF THE INVENTION

The present invention relates to an apparatus for storing bicycles. More particularly, the invention is directed to an apparatus for suspending bicycles above ground level.

BACKGROUND OF THE INVENTION

Many devices for storing bicycles above ground level are well known in the art. Among known bicycle storage devices are hooks which may be secured to a ceiling or a wall and which are designed to suspend a bicycle from one of its wheels. Also known are hangers or racks which are secured to a wall and engage various portions of a bicycle in order to suspend it. Many such rack devices are rather large and cumbersome and not well suited for use in home, condominiums or apartments. Moreover, more than one such rack device often must be used in order to support one or more bicycles.

Accordingly, there is a need for a small-scale bicycle storage apparatus which may be used alone in order to conveniently and efficiently store bicycles above ground level in homes, condominiums or apartments.

SUMMARY OF THE INVENTION

The bicycle support rack of the present invention is intended to be secured to a wall, post or other load bearing means independent of the apparatus itself. The rack comprises a vertically disposed bracket which is adapted to be secured to an independent load bearing means. Adjacent to and integral with the bracket portion is a deformable arm having three distinct sections. A first section of the arm is adjacent the bracket and is angularly disposed at an angle of between 30° and 60°, and preferably 45°, with the bracket A second section is adjacent the first section and is substantially horizontally disposed. A third section is adjacent the second section and is disposed at an angle approximately equal to that of the first section. The terminal end of the third section has permanently affixed thereto a bicycle engaging portion which may be in the form of an upwardly facing, v-shaped member adapted to supportingly engage the top tube of a bicycle.

Alternatively, the arm may simply comprise a continuously curved, substantially semicircular member integrally secured to and adjacent the bracket.

BRIEF DESCRIPTION OF THE DRAWINGS

FIG. 1 is a perspective view of the bicycle support rack of the present invention showing the rack mounted to a wall and supporting a bicycle.

FIG. 2 is a side view of the bicycle support rack of FIG. 1.

FIG. 3 is a front view of the bicycle support rack illustrated in FIG. 1.

DETAILED DESCRIPTION OF THE INVENTION

Referring to FIGS. 1, 2 and 3 the support rack 10 of the present invention is affixed to a wall 12 by way of wood screws 14 or similar securing means such as lag bolts, or the like, of sufficient strength to bear the weight of the rack and a bicycle 30. The support apparatus 10 comprises a vertically disposed bracket means 16 which is flushly mounted to and secured to wall 12. Integrally connected to and adjacent to bracket 16 is arm 18 which is deformable when subjected to a load. Arm 18 may comprise a first section 20 which is immediately adjacent the bracket 16 and is downwardly disposed at an angle α of between 30° and 60°, preferably about 45°, with the bracket. A second section 22 is adjacent first section 20 and is substantially horizontally disposed. Third section 24 is the adjacent second section 22 and is disposed at an angle β equal to that of the first section 20. The terminal end 26 of the third section 24 is equipped with a horizontally disposed bicycle engaging portion 28 which is adapted to supportingly engage a bicycle 30 by receiving the top tube 32 of the bicycle.

Bicycle engaging portion 28 is preferably an upwardly facing, v-shaped member having dimensions sufficient to receive the cross-bar of a bicycle which is to be supported. In a preferred embodiment, the third section 24 of the arm means 18 is upwardly oriented at an angle β of approximately 45°. Preferably, the v-shaped member is constructed of an approximately four inch section of 1½ inch angle iron. One surface 36 of the angle iron may be permanently secured, preferably by welding, to the top surface 38 of the third section 24.

In this manner an upper surface of the third section flushly mounts with an outer surface of the bicycle engaging means 28. Thus, when the third section is upwardly directed from the second section at the preferred angle β of approximately 45°, the v-shaped bicycle engaging portion 28 faces upwardly and each side arm 15, 17 of the bicycle engaging portion 28 is offset from horizontal by an angle of approximately 45°.

In order to avoid scratching or chipping any component of the bicycle, the bicycle engaging portion 28 may be equipped with non-abrasive pads 34 which may be constructed of a polymeric material such as polyurethane, a polyolefin, or similar polymers. Alternatively, the bicycle engaging means 28, as well as the entire support rack, may be coated with a polymeric compound, such as vinyl, in order to reduce the risk of damaging bicycles.

When, as shown in FIG. 1, the apparatus 10 of the present invention is subjected to the load of a bicycle 30, the arm 18 deforms as angles α and β decrease. This feature is believed to absorb some of the force tending to pull bracket 16 away from the wall 12.

The apparatus 10, may be constructed of steel, iron, aluminum or even high strength polymers of sufficient strength to withstand the load of a bicycle. Preferably, however, the apparatus 10 is constructed of a hot rolled steel.

Although the preferred embodiment of the present invention has been described above, it is understood that modifications of the design of the bicycle support rack may be made without departing from the scope of the present invention. For example, the bicycle engaging portion 28 may comprise a u-shaped member, or similarly shaped member, or a similar clamping device which securely engages and supports a bicycle.

In the event that it is desired to support the bicycle by some component other than the top tube, for example a down tube of a women's bicycle, the bicycle engaging portion may be oriented at an angle to correspond to the component of the bicycle to be supported. Additionally, a clamping device may be used in conjunction with the bicycle engaging portion to positively engage the bicycle and ensure that the bicycle is securely held. Alternatively, bicycle engaging portion may be pivotally secured to the third section, rather than welded, in order to orient the bicycle engaging means at a desired angle. A clamping portion may also be included to secure the bicycle.

In alternative embodiments, it is possible to construct the arm 18 such that its various sections are disposed at angles other than those noted above. Also, the arm means may comprise a continuously curved, substantially semicircular member.

In another embodiment of the invention, the arm 18 of the bicycle support rack 10 need not extend downwardly from the bottom portion of the bracket, but may instead extend upwardly from the top portion of the bracket. In this embodiment (not shown) the first section 20 of the arm portion 18 may extend upwardly from the top portion of bracket 16. Second section 22 will extend horizontally from the first section and the third section will extend downwardly at an angle opposite that of the first section. The bicycle engaging portion 28 may be arranged in a similar fashion such that it extends upwardly and has one surface wall flushly mounted to the top surface of the third section.

Those skilled in the art may find other variations in the apparatus or other embodiments for the apparatus without departing from the scope of the present invention.

What is claimed is:

1. A bicycle support apparatus comprising:
   an elongate vertically disposed bracket adapted to be flushly affixed to an independent load bearing means;
   a deformable arm means integrally connected to said bracket means, said arm means comprising a first section, adjacent said bracket means, disposed at an angle of between 30° and 60° with said bracket means, a substantially horizontal second section adjacent said first section, and a third section, comprising the terminal end of the arm means adjacent said second section, disposed at an angle substantially equal to that of said first section;
   a bicycle engaging means secured to the terminal end of said arm means for engaging a cross bar of a bicycle to support said bicycle.

2. The apparatus of claim 1 wherein said bicycle engaging means further comprises a non-abrasive pad means mounted on the surfaces of said bicycle engaging means which contacts a bicycle to be mounted thereon.

3. The apparatus of claim 2 wherein said apparatus has a non-abrasive polymer coating.

4. The apparatus of claim 3 wherein said bracket means further comprises means for affixing said apparatus to an independent load bearing means.

5. The apparatus of claim 4 wherein said bicycle engaging means is a horizontally disposed, upwardly facing v-shaped member having diverging sidewalls adapted to receive a cross-bar of a bicycle.

6. The apparatus of claim 1 wherein said apparatus is constructed of a steel.

7. The apparatus of claim 1 wherein said apparatus is constructed of aluminum.

8. The apparatus of claim 1 wherein said apparatus is constructed of a polymeric material.

9. The apparatus of claim 1 wherein said first section extends downwardly from a bottom portion of said bracket means at an angle of approximately 45°.

10. The apparatus of claim 1 wherein said first section extends upwardly from a top portion of said bracket means at an angle of approximately 45°.

11. The apparatus of claim 1 wherein one of said diverging sidewalls of said bicycle engaging means is flushly mounted to an upwardly facing surface of said arm means.

12. Apparatus of claim 1 wherein said bicycle engaging means is permanently secured to said arm means.

13. A bicycle support apparatus as claimed in claim 1 wherein said deformable arm means comprises a continuously curved substantially semicircular member.

* * * * *